(12) United States Patent
Graves et al.

(10) Patent No.: US 7,102,114 B2
(45) Date of Patent: Sep. 5, 2006

(54) ELECTROMAGNETICALLY DRIVEN MEMBRANE MIRROR ASSEMBLY

(75) Inventors: J. Elon Graves, Los Gatos, CA (US); Malcolm J Northcott, Felton, CA (US); J. Christopher Shelton, Los Gatos, CA (US); Jeffrey W Douglass, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 109 days.

(21) Appl. No.: 10/794,973

(22) Filed: Mar. 4, 2004

(65) Prior Publication Data

US 2005/0194513 A1    Sep. 8, 2005

(51) Int. Cl.
*G02B 7/04* (2006.01)
*G02B 7/182* (2006.01)

(52) U.S. Cl. ............ 250/201.9; 359/872; 359/846
(58) Field of Classification Search ............ 250/201.9; 359/872, 846, 637; 356/512–515
See application file for complete search history.

(56) References Cited

U.S. PATENT DOCUMENTS 5,373,151 A * 12/1994 Eckel et al. ............ 250/208.1
6,452,145 B1 * 9/2002 Graves et al. ............ 250/201.9
6,839,190 B1 * 1/2005 Nishioka et al. ............ 359/726
6,945,658 B1 * 9/2005 Borra et al. ............ 359/846
2002/0196506 A1 * 12/2002 Graves et al. ............ 359/172
2004/0190000 A1 * 9/2004 Thibault ............ 356/512

FOREIGN PATENT DOCUMENTS

GB       2247323 A  *  2/1992

* cited by examiner

*Primary Examiner*—Thanh X. Luu
*Assistant Examiner*—Stephen Yam
(74) *Attorney, Agent, or Firm*—Fenwick & West LLP

(57) ABSTRACT

In an optics system, a flexible mirror is deformed with an electromagnetic force. In one embodiment, an electrical current is directed through the mirror, or a conductor attached to the mirror, in the presence of a magnetic field. In one application in an adaptive optics system, the membrane mirror is used in a wavefront sensor. Deformed to oscillate between convex and concave positions, the mirror is used to alternately defocus a received light signal for determining aberrations in the light signal. By detecting aberrations in the light signal, the adaptive optics system can correct for those aberrations.

18 Claims, 3 Drawing Sheets

ELECTROMAGNETICALLY DRIVEN MEMBRANE MIRROR ASSEMBLY

BACKGROUND

1. Field of the Invention

This invention relates generally to membrane mirror assemblies as may be used in adaptive optics systems, and in particular to deforming a membrane mirror used in a wavefront sensor for detecting aberrations in light signals.

2. Background of the Invention

There is an increasing interest in the use of free-space optical communications for various applications. For example, much of the current telecommunications infrastructure is based on the transmission of optical signals via optical fibers. While the use of fiber optics has increased the capacity and efficiency of data transmission, there are many situations where the installation of new fiber is not the best solution. As a result, there is interest in augmenting the telecommunications infrastructure by transmitting optical signals through the free-space of the atmosphere.

Free-space optical communications links can also be used advantageously in applications outside of the telecommunications infrastructure. Compared to other communications technologies, a free-space optical communications link can have advantages of higher mobility and compact size, better directionality (e.g., harder to intercept), faster set up and tear down, and/or suitability for situations where one or both transceivers are moving. Thus, free-space optical communications links can be used in many different scenarios, including in airborne, sea-based, space and terrestrial situations.

However, in many of these potential applications, the free-space optical communications link suffers from optical aberrations. For example, changes in atmospheric conditions can be a significant impediment to the accuracy, reliability, and efficiency of free-space optical communications systems. Wind, heat waves, man-made pollutants, and other effects can create constantly changing aberrations. This, in turn, can degrade the quality of the optical signal that is available at the receiver, resulting in degradation of the overall quality and efficiency of the communications channel.

To address the problem of optical aberrations, adaptive optics systems have been developed to compensate for these aberrations, thus improving the performance of free space optical communications systems. In addition to free-space optical communications, adaptive optics systems can be applied in other areas where optical aberrations are also problematic, such as in telescope imaging systems.

Many adaptive optics systems have a wavefront sensor, which senses the aberrations in the wavefront of received light waves. Existing methods and devices for sensing and measuring the wavefront include several interferometric techniques, the Shack-Hartmann wavefront sensing techniques, and various other systems that involve the projection of patterns of light through an optical system. Once the wavefront senor has measured these aberrations, it can provide a signal to a device for correcting the aberrations, such as a deformable mirror. By adaptively deforming to compensate for the measured aberrations in the light waves, the optical system can correct for these aberrations.

In some wavefront sensors, a modulation device adds a focus (spherical phase factor) term to the incoming light signal at an image plane. To do this, for example, a membrane mirror introduces a dither in the optical path, and the wavefront sensor evaluates the wavefront based on the dithered signal. This can be accomplished using an acoustically driven membrane mirror, using air pressure to deform the membrane mirror and cycle it between convex and concave positions. However, such mirrors are difficult to manufacture in a small form factor and tend to be somewhat unstable over time. Additionally, an acoustic driving mechanism cannot work in environments with little or no air, such as in space and high flying aircraft applications. Acoustic systems also suffer from poor performance due to complicated resonance peaks at various frequencies. Moreover, acoustic systems are highly sensitive to their environment, where changing temperatures and/or pressures during operation further complicates the performance characteristics of the wavefront sensor.

To obtain the spherical deformation for the correct operation of the wavefront sensor, it is desirable to exert a uniform force or pressure on the membrane surface of the mirror. Although acoustic drivers tend to exert this uniform pressure, they suffer from the drawbacks outlined above. Accordingly, it is desirable to produce a sufficient uniform pressure on membrane mirror as desired for a wavefront sensor without suffering from the deficiencies of acoustically driven membrane mirrors.

SUMMARY OF THE INVENTION

In an adaptive optics system, a direct drive membrane mirror assembly avoids the deficiencies of acoustically driven membrane mirrors while achieving proper deformations for use in wavefront sensors. This is accomplished by driving the membrane mirror electromagnetically rather than with air pressure. For example, an electrical current is directed through the mirror, or a conductor attached to the mirror, in the presence of a magnetic field. This causes a generally uniform force on the mirror that tends to deflect the membrane mirror into a convex or concave position, depending on the orientation of the force.

In one embodiment, a wavefront sensor for an adaptive optics system includes a flexible mirror that has a reflective surface that reflects a light signal received by the wavefront sensor. A conductor is mechanically coupled to the mirror and oriented to conduct an electrical current generally in a direction in the plane of the mirror, while a magnetic field source is oriented to cause an electromagnetic force applied to the mirror in response to an electrical current in the conductor. In this way, deformations can be precisely applied to the reflective surface of the flexible mirror by controlling the current through the conductor using a driving circuit and/or by changing the strength of the magnetic field in the region of the mirror. To increase the magnetic field near the mirror and thus the deformation of the mirror, the wavefront sensor can be mounted in a housing that is formed of a magnetically permeable material. Additionally, in another embodiment, a preload cone is mechanically coupled to the mirror for applying a normal force to a perimeter of a region of the mirror to maintain the region in tension.

In another embodiment, an adaptive optics system comprises an optics path for receiving a light signal, a deformable mirror, a wavefront sensor, a control module, and a receiver. The wavefront sensor includes a membrane mirror, an electromagnetic driving mechanism, and a detector. An electromagnetic driving mechanism oscillates the membrane mirror between convex and concave positions to defocus the light signal, alternately positively and negatively, onto the detector, which senses the intensity of the light signal at a number of locations on the detector. Coupled to the detector of the wavefront sensor, a control module determines any aberrations in the light signal based on the sensed intensities of the light signal. The control module then sends a signal to the deformable mirror to deform that mirror to correct for the determined aberrations. A corrected light signal is thus obtained by reflecting the light signal with this deformable mirror. In one embodiment, the membrane mirror is driven electromagnetically by applying an electrical current through a conductor mechanically coupled to the membrane mirror in the presence of a magnetic field.

DETAILED DESCRIPTION OF THE PREFERRED EMBODIMENTS

Figure 1:
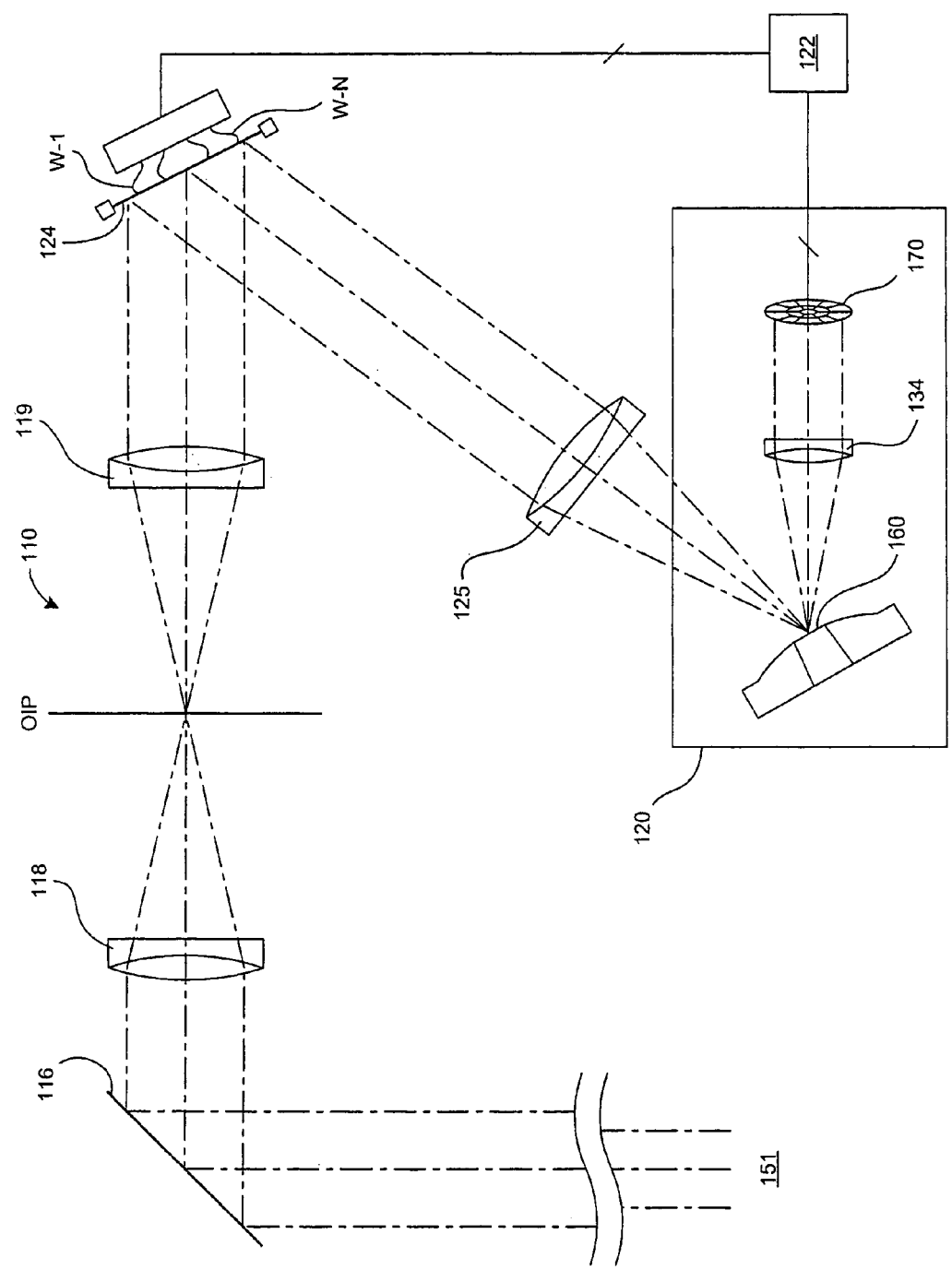
FIG. 1 is a schematic diagram of an adaptive optics system that includes a wavefront sensor and deformable mirror in accordance with an embodiment of the invention.

In one embodiment of the present invention, a direct drive membrane mirror is provided for use in a wavefront sensor of an adaptive optics system. FIG. 1 illustrates a specific implementation of an adaptive optics system that incorporates a wavefront sensor with a direct drive membrane mirror. This system includes a telescope 110 with an adaptive optics module. Light rays 151 from a remote light source enter the system via a tip-tilt mirror 116. The system may further include data transmitter and receiver portions, neither of which is shown in FIG. 1 for clarity.

In one application, the receiving telescope 110 is designed to be positioned vertically. The tip-tilt mirror 116 can be pivoted about two perpendicular axes, one on the vertical axis of the telescope like a turret and the other horizontal in the plane of the mirror. In this way, the tip-tilt mirror 116 enables tip and tilt adjustments of the incoming light. As an alternative, the telescope 110 may be rotatable about its vertical axis so that one axis of rotation for the mirror 116 may be eliminated. Other alternative arrangements may be used for the coarse pointing or aiming of the telescope, such as using other tip-tilt mirrors or translating the objective lens by small amounts.

From the tip-tilt mirror 116, the light rays 151 travel through a lens 118 that focuses the light rays on an object image plane (OIP), where the image of the remote light source exists in focus but is uncorrected. The light rays 151 then pass through a collimating lens 119 to a deformable mirror 124. The deformable mirror 124 is dynamically shapeable. To correct for aberrations in the wavefront, the mirror 124 can be controlled according to wavefront measurements made by a wavefront sensor 120. The conjugates of the deformable mirror 124 can be adjusted, for example by inserting a conjugate tuning element at the OIP. Examples of conjugate tuning elements include an insertable lens, zoom lens, or a second deformable mirror.

Various types of wavefront sensors and deformable mirrors may be used in the adaptive optics system. In this example, the deformable mirror 124 is a deformable curvature mirror based on applying different voltages across different areas of a piezoelectric material, thus causing deformation. Further details for this type of deformable mirror are described and shown in U.S. Pat. No. 6,464,364, "Deformable Curvature Mirror," filed Jan. 25, 2001 and issued Oct. 15, 2002, by J. Elon Graves and Malcolm J. Northcott; U.S. Pat. No. 6,568,647, "Mounting Apparatus for Deformable Mirror," filed Jan. 25, 2001 and issued May 27, 2003, by J. Elon Graves and Malcolm J. Northcott; U.S. patent application Ser. No. 09/892,913, "Atmospheric Optical Data Transmission System," filed Jun. 16, 2001 by J. Elon Graves and Malcolm J. Northcott; and U.S. patent application Ser. No. 10/688,087, "Deformable Mirror With Perimeter Wiring," filed Oct. 16, 2003 by J. Elon Graves, Malcolm J. Northcott, and J. Christopher Shelton. All of the foregoing are incorporated herein by this reference.

In the example of FIG. 1, the wavefront sensor 120 is a wavefront curvature sensor based on defocused pupil images. Further details for this type of wavefront curvature sensor are described and shown in U.S. Pat. No. 6,452,145, "Method and Apparatus for Wavefront Sensing," filed May 26, 2000 and issued Sep. 17, 2002, by J. Elon Graves and Malcolm J. Northcott; and U.S. patent application Ser. No. 09/892,913, "Atmospheric Optical Data Transmission System," filed Jun. 16, 2001 by J. Elon Graves and Malcolm J. Northcott. All of the foregoing are incorporated herein by this reference.

The light rays reflect from the surface of the deformable mirror 124 to a lens 125 that refocuses the image on a vibrating membrane mirror 160. The light is reflected from the vibrating membrane mirror 160 through a lens 134 onto a segmented detector 170. When the membrane mirror 160 is not vibrating—when it is flat—the deformable mirror 124 is imaged onto the detector 170. But when the membrane mirror 160 vibrates, it flexes between concave and convex conditions so that the image is defocused, alternately positively and negatively, onto the detector 170. In this way, the vibrating mirror 160 introduces a temporal defocus dither in the optical path. The membrane mirror 160 vibrates at a frequency that typically does not exceed a few tens of kilohertz. The optical path (or defocus) is effectively dithered at this same frequency, and the wavefront information occupies a frequency band around the dither frequency. The segmented detector 170 detects the intensities at different locations (i.e., for each segment) and sends this information to a control module 122 for determining the curvature of the wavefront.

Software within the control module 122 derives the wavefront curvature and provides corresponding control signals to the deformable mirror 124. Specifically, the variable focus dither introduced by the membrane mirror 160 results in a signal component at the dither frequency. The magnitude of this component is proportional to the wavefront curvature within the pupil and proportional to the wavefront radial tilt on the boundary of the pupil. The wavefront is derived or recovered by solving the Poisson equation with respect to intensities with Neumann boundary conditions relative to the shape of the extra focal images. An iterative data reduction algorithm or other non-linear fitting technique may be employed to compensate for non-linearity in measurements in an open loop system.

The control module 122 provides separate and controlled high voltage signals to electrode segments on the back of the deformable mirror 124, as represented by the reference numerals W-1 through W-N. The deformable mirror 124 is positioned to reflect light rays from the collimating lens 119 to the wavefront sensor 120. The overall slope and curvature of the deformable mirror 124 can be controlled by varying the voltages applied to the electrodes.

In one implementation, the detector 170 is segmented. The optical pupil is divided into subapertures, each subaperture portion of the optical beam falling on a separate detector segment. Each detector segment generates a separate electrical signal, as indicated by the slash across the line running from the segmented detector 170 to the control module 122. Each electrical signal provides information about the overall wavefront and the wavefront determination is made by processing these electrical signals. For data detection purposes, the segmented detector 170 essentially operates as a light bucket. Data can be recovered by combining some or all of the electrical signals and processing the combined signal. The wavefront information and data signal can be separated on the basis of frequency, for example.

Figure 2:
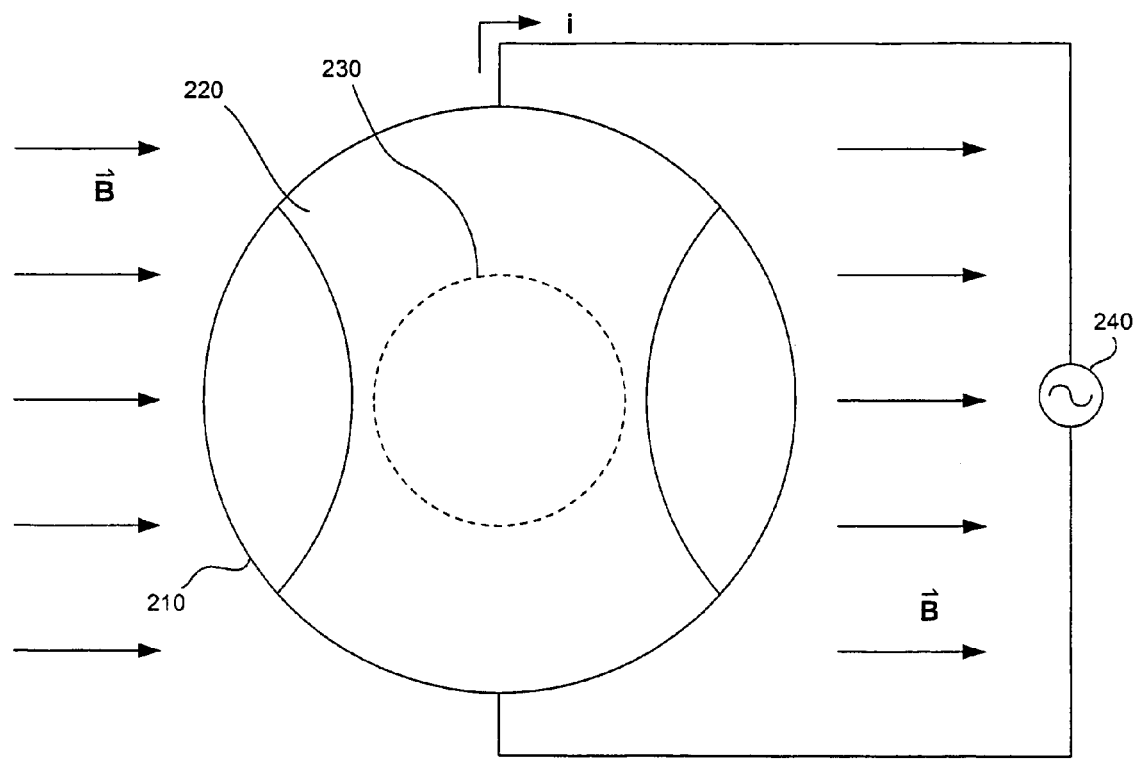
FIG. 2 is a schematic diagram of a deformable membrane mirror and driving circuit in accordance with an embodiment of the invention.

Rather than being acoustically driven by a source of air pressure, the membrane mirror 160 of the wavefront sensor 120 is driven by an electromagnetic force. FIG. 2 is a schematic representation of one embodiment of the direct drive membrane mirror 160. In one embodiment, the membrane mirror 160 is formed from a thin, flexible membrane, or pellicle 210. The pellicle 210 is made of suitable flexible material, such as nitrocellulose. Preferably, the material and dimensions of the pellicle 210 are selected so that the pellicle 210 has a resonant frequency above the desired operating frequency range of the mirror 160. In this way, the membrane mirror 160 will not suffer from unwanted resonance effects.

On at least one side of the pellicle 210 is formed a mirrored surface. The mirrored surface on the pellicle 210 can be formed by depositing a reflective coating on a surface of the pellicle 210. This can be performed, for example, by depositing a source metal, such as gold or aluminum, using electron beam or thermal deposition. This mirrored surface provides the light reflecting function of the membrane mirror 160 described in connection with the adaptive optics system of FIG. 1. Spherical deformations of the pellicle 210 thus result in an effective convex or concave mirror, which focuses and defocuses light accordingly. In an alternative embodiment, both surfaces of the pellicle 210 can be mirrored. In this way, light can be reflected off both sides of the membrane mirror 160 and thus measured by the wavefront sensor 120 at both its convex and concave positions simultaneously. This reduces errors caused by having to wait for the mirror 160 to cycle between convex and concave, since that time period allows the light signal to change between measurements.

The pellicle 210 also has a conductive surface 220, which results in an electrically conductive path from one end of the pellicle 210 to the other. The conductive surface 220 of the pellicle 210 may cover only a portion of the pellicle's surface area, as shown in FIG. 2. The conductive surface 220 can be formed of a conductive material deposited on a surface of the pellicle 210. Like the mirrored surface, the conductive surface 220 can be deposited by electron beam or thermal deposition. Alternatively, the conductive surface 220 comprises a separate conductor (e.g., a film of conductive material) or plurality of conductors (e.g., a series of small wires in a parallel arrangement) coupled mechanically to the pellicle 210. Preferably, the conductive surface 220 is sufficiently thick to have a low electrical resistance, reducing power losses in the conductive surface 220 during operation and the accompanying heat generation. In one embodiment, the conductive surface 220 is also reflective to provide the mirrored surface functionality of the membrane mirror 160.

In operation, the pellicle 210 is deformed in a desired position by an electromagnetic force. In the embodiment shown in FIG. 2, an electrical current is directed through the conductive surface 220 of the pellicle 210 by a driving circuit. A magnetic field, B, is directed so that it has a component that is parallel to the pellicle's surface and perpendicular to the current flow in the conductive surface 220. As is well known, an electrical charge moving in a magnetic field is acted upon by a force that is normal to the velocity of the electrical charge and the magnetic field. Accordingly, by driving an electrical current through the conductive surface 220, the pellicle 210 is deflected by a resulting electromagnetic force normal to the surface of the pellicle 210. Although the magnetic field need not be normal to the current in the conductive surface 220, orienting the magnetic field in that way reduces the required amount of magnetic field and/or electrical current needed to achieve a given deflection in the pellicle 210. In one embodiment, an oscillator 240 provides an alternating current to the conductive surface 220, thus causing the membrane mirror 160 to oscillate between convex and concave positions.

Where an approximately spherical deformation is desired, the pellicle 210 may be mechanically biased around the perimeter of a circular region of the pellicle 210, such as the region defined by dotted line 230. By biasing the pellicle 210 in this way, forces on the pellicle 210 outside the biased region do not affect deformations within the region. Biasing the pellicle 210 also helps to adjust the desired tension in the operable region of the pellicle 210. To achieve an approximately spherical deformation within the biased region of the pellicle 210, it is desirable to have an approximately uniform normal force applied within that region. Therefore, the conductive surface 220 preferably covers the entire biased region within line 230 so that an approximately uniform electrical current will flow therein.

Figure 3:
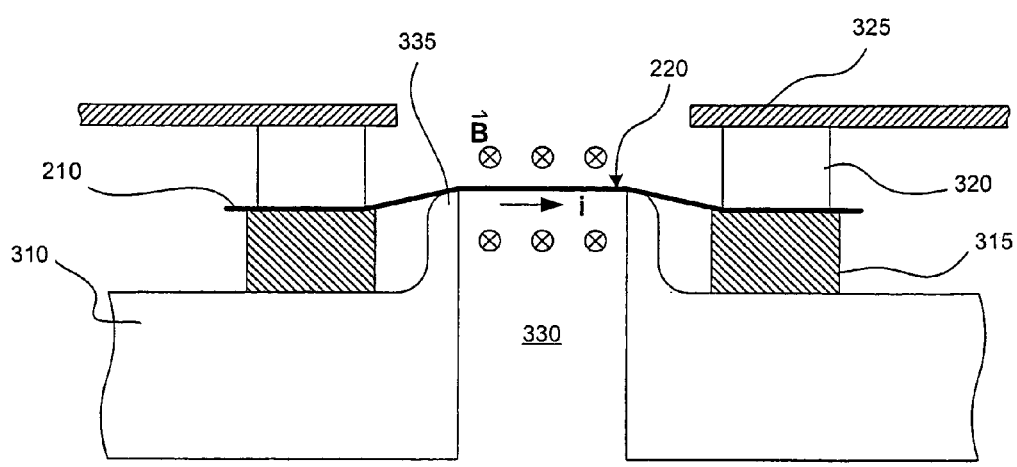
FIG. 3 is a cross sectional side view of an embodiment of the direct drive membrane mirror.
Figure 4:
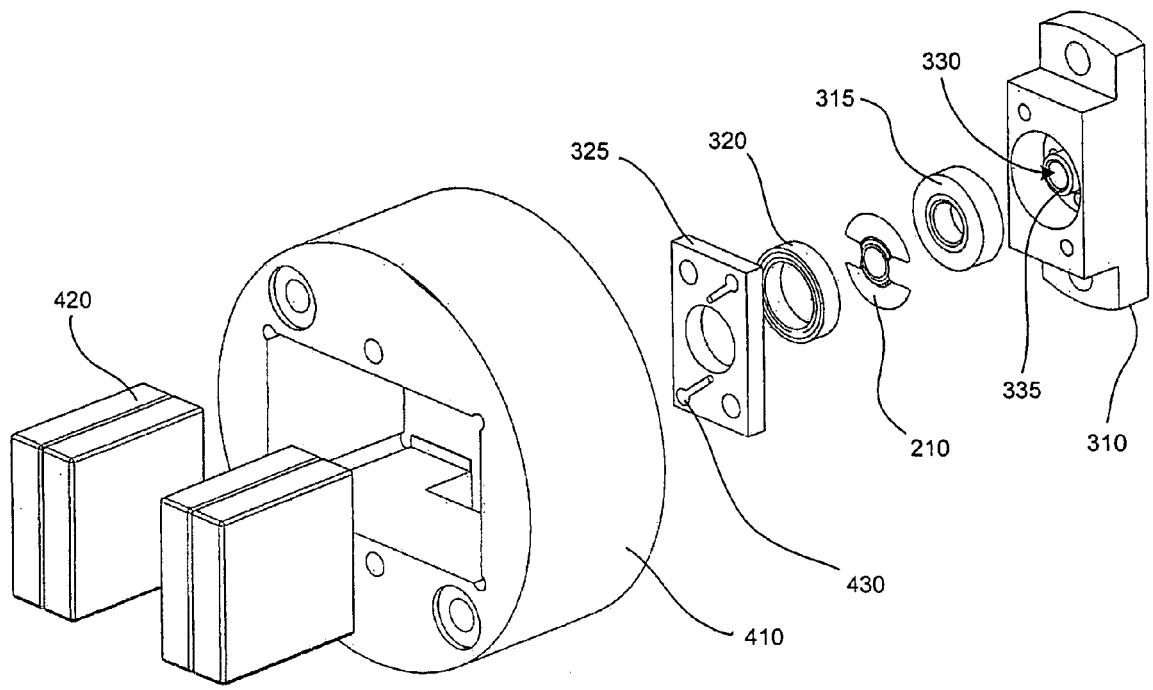
FIG. 4 is an exploded view of the direct drive membrane mirror assembly shown in FIG. 3.

FIG. 3 illustrates one implementation of the membrane mirror 160 described above. Shown in a cross sectional view, a direct drive membrane mirror assembly includes a pellicle mount 310, a pellicle ring 315, a pellicle 210, a conductor 320, a circuit board 325, and a preload cone 335. FIG. 4 is an exploded view of the direct drive membrane mirror assembly of FIG. 3, further illustrating a housing 410 for the membrane mirror assembly and one or more permanent magnets 420 for providing the requisite magnetic field. In one embodiment, the parameters of the design shown in FIGS. 3 and 4 are selected achieve a sufficient deflecting force on the pellicle 210 while avoiding generating a large amount of heat energy, which may damage the pellicle 210 and/or other parts of the mirror assembly. In addition, it is desirable to minimize the amount of driving current and magnetic flux needed to deflect the pellicle 210 a particular amount.

As described above, mechanically biasing the pellicle 210 serves to isolate an operable region of the pellicle 210 from external forces other than the driving electromagnetic force intended to deform the pellicle 210. In one embodiment, therefore, a preload cone 335 is used to bias the pellicle 210 around a circular perimeter 230 that defines an operable region of the membrane mirror 160. To achieve the proper biasing, the pellicle 210 is attached to the pellicle ring 315, which is fixed to the pellicle mount 310. The pellicle mount 310 has a hole 330 formed therethrough to allow deformation of the pellicle 210 and, in some designs, to allow a light signal to pass through. A cylindrical preload cone 335 extends from the pellicle mount 310 to press against and mechanically bias the pellicle 210. In one embodiment, the preload cone comprises a thermally conductive material for dissipating heat generated by dissipation of electrical current in the conductive surface 220 of the pellicle 210. As explained above, the reflective mirrored surface of the pellicle 210 can be on either surface or both surfaces, depending on the intended application and orientation of the mirror 160 in the optics system.

As shown in FIG. 3, the pellicle 210 is oriented so that its conductive surface 220 directs an electrical current, i, from one side of the pellicle 210 to the other. To provide the needed electrical energy, a circuit board 325 is coupled to the conductive surface 220 of the pellicle 210 using a conductor 320, as shown. In one embodiment, the conductor 320 comprises a zebra strip conductor. Zebra strip conductors provide good electrical connections; however, they have a relatively high resistance and thus may cause a high amount of heat to be generated. In another embodiment, Mylar circuitry is used for the conductor 320. The circuit board 325 provides an electrical interface from the mirror assembly to a driving circuit (an embodiment of which is described below in connection with FIG. 5).

As FIG. 3 illustrates, a magnetic field is directed perpendicular to the electrical current in the conductive surface 220 but parallel to the surface of the pellicle 210 (i.e., "into the paper," as shown in the figure). This results in a maximum amount of electromagnetic force applied normal to the pellicle 210 for deforming the mirror into concave and convex positions. Preferably, the magnetic field is substantially uniform throughout the operable region of the pellicle 210, thus causing a substantially uniform electromagnetic force. In one embodiment, one or more permanent magnets 420 are used to provide the needed magnetic field. In a typical application, magnets 420 that provide about 4000 Gauss of magnetic field, or magnets of approximately one half Tesla, are sufficient to deflect the membrane mirror 160.

To increase the magnetic field in the region of the pellicle 210, the mirror assembly and the magnets 420 are located in a housing 410 made of a high magnetic permeability material and preferably has a geometry that allows optimal magnetic saturation. Effectively, the housing 410 operates to complete the magnetic circuit between the magnets 420, which increases the magnetic field between the magnets. By increasing the magnetic field in the area of the pellicle 210, a lower amount of electrical current through the pellicle 210 is needed for the desired deformation of the pellicle 210. In an alternative embodiment, electrical coils can be used to generate the required magnetic field; however, generating a magnetic field using current coils may be undesirable because they electric coils generate heat and consume power.

Figure 5:
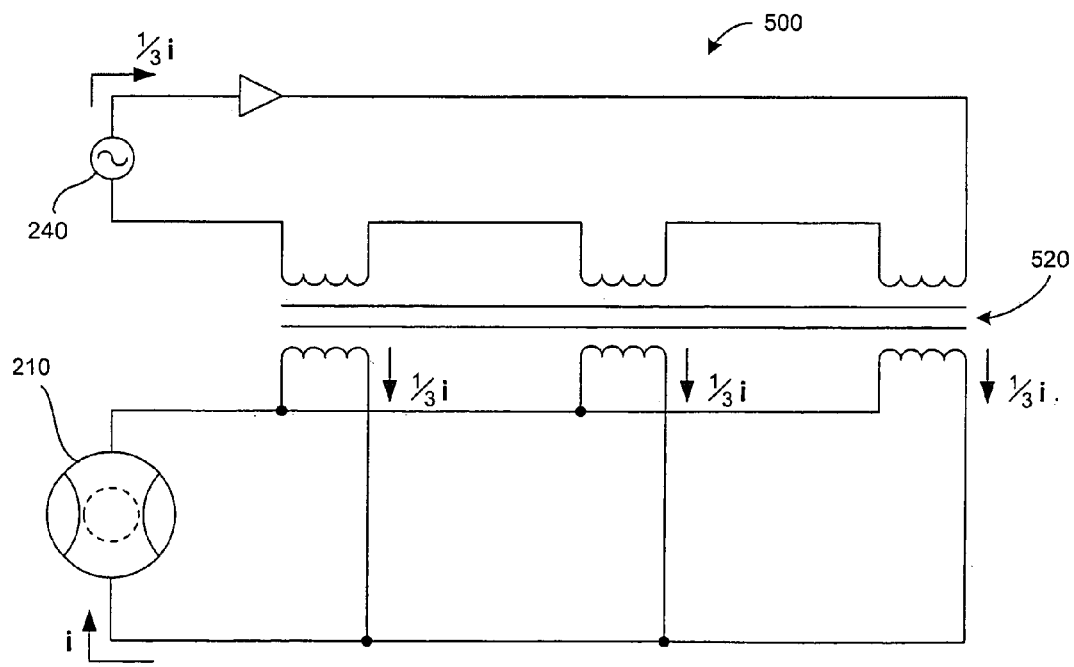
FIG. 5 is a schematic diagram of a circuit for driving the membrane mirror in accordance with an embodiment of the invention.

As FIG. 4 illustrates, the circuit board 325 includes bonding pads 430 that are electrically coupled to the conductor 320 and pellicle 210 by conductive traces and/or vias on the circuit board 325. The bonding pads 430 on the circuit board 325 allow the mirror assembly to be easily coupled to a source of electrical current for driving the mirror 160. FIG. 5 illustrates a schematic of one embodiment of a driving circuit 500 for providing an electrical current to the mirror assembly. The driving circuit 500 comprises an oscillator 240 that is coupled to the pellicle 210 via a transformer 520. As shown, the transformer 520 steps up, or multiplies, the current available to drive pellicle 210 while providing a more efficient match to the load resistance of pellicle 210, which can be a small fraction of an ohm. In the example of FIG. 5, with three identical coils in series on the driving side, and three identical coils in parallel on the load side, the electrical current is increased threefold. Increasing the current advantageously increases the deflection in the pellicle 210. Additionally, the transformer 520 acts to block any DC current from the oscillator section of the driving circuit 500 so that the conductive surface 220 of the pellicle 210 does not become saturated with current in either direction.

Various alternative configurations and embodiments for driving a thin flexible mirror with an electromagnetic force are possible in view of the disclosure above. In one embodiment, for example, the membrane mirror comprises a pellicle that has a magnetic film formed thereon, instead of an electrical conductor. A series of conductors adapted to carry a driving current are then located near the pellicle. The magnetic film of the pellicle is oriented so that it causes a magnetic field in the region of the conductors, the magnetic field having a components perpendicular to the conductors. In such a configuration, a current in the conductors results in an electromagnetic force, as described above. By fixing the conductors mechanically, the resulting electromagnetic force causes the magnetic film on the pellicle, and thus the pellicle itself, to deflect from a resting position. As described above, this deflection can be controlled by varying the driving current.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A wavefront sensor for an adaptive optics system, the wavefront sensor comprising:
    a flexible mirror having at least one reflective surface for reflecting a light signal received by the wavefront sensor, the mirror further including a conductor that is oriented to conduct an electrical current in a direction generally parallel to the reflective surface;
    a magnetic field source configured to cause an electromagnetic force applied to the reflective surface of the mirror in response to an electrical current in the conductor, the electromagnetic force tending to deform the reflective surface of the mirror;
    a driving circuit coupled to supply an electrical current to the conductor to oscillate the flexible mirror between convex and concave positions to defocus the light signal, alternately positively and negatively; and
    a detector optically coupled to the mirror to sense the intensities of a light signal reflected from the mirror to different locations on the detector.

2. The wavefront sensor of claim 1, wherein the magnetic field source is configured to provide a magnetic field that is generally perpendicular to an electrical current in the conductor.

3. The wavefront sensor of claim 1, wherein the magnetic field source comprises one or more permanent magnets.

4. The wavefront sensor of claim 1, wherein the mirror is mechanically biased normal to the mirror along a perimeter of a circular region within the mirror.

5. The wavefront sensor of claim 4, wherein the conductor is mechanically coupled to the mirror and is configured to conduct electrical current substantially evenly throughout the biased circular region of the mirror, thereby causing a generally constant electromagnetic force on the mirror within the biased circular region.

6. The wavefront sensor of claim 1, wherein the driving circuit comprises means for stepping up the electrical current supplied to the conductor.

7. The wavefront sensor of claim 1, wherein the driving circuit comprises means for blocking direct current to the conductor.

8. The wavefront sensor of claim 1, wherein the driving circuit is configured to supply the conductor with an alternating current to cause the reflective surface of the mirror to oscillate between concave and convex positions, thereby causing a variation in the optical path of the received light signal for detecting wavefront information for the light signal.

9. The wavefront sensor of claim 1, further comprising:
a control module coupled to the detector for determining any aberrations in the wavefront of the received light signal based on the sensed intensities of the light signal.

10. The wavefront sensor of claim 9, wherein the control module is configured to generate a control signal to a deformable mirror to deform the deformable mirror to correct for the determined aberrations.

11. The wavefront sensor of claim 1, wherein the reflective surface of the mirror is the conductor.

12. The wavefront sensor of claim 1, wherein the mirror includes two opposing reflective surfaces, where one of the reflective surfaces is in a concave position when the other reflective surface is deformed into a convex position, each of the reflective surfaces configured to reflect simultaneously a light signal received by the wavefront sensor.

13. An adaptive optics system comprising:
an optics path for receiving a light signal;
a deformable mirror optically coupled to reflect the received light signal;
a wavefront sensor that includes a membrane mirror, an electromagnetic driving mechanism, and a detector, wherein the electromagnetic driving mechanism is configured to oscillate the membrane mirror between convex and concave positions to defocus the light signal, alternately positively and negatively, onto the detector, the detector sensing the intensity of the light signal at a number of locations on the detector; the electromagnetic driving mechanism comprising:
a conductor mechanically coupled to the membrane mirror,
a circuit coupled to drive an electrical current in the conductor, and
a magnetic field source oriented to cause an electromagnetic force on the conductor in response to an electrical current therein, the electromagnetic force tending to deform the membrane mirror;
a control module in communication with the detector of the wavefront sensor, the control module configured to determine aberrations in the light signal based on the sensed intensities of the light signal, the control module further coupled to cause the deformable mirror to deform to correct for the aberrations;
and a receiver optically coupled to receive the corrected light signal.

14. The adaptive optics system of claim 13, wherein the wavefront sensor further comprises means for mechanically biasing the membrane mirror.

15. The system of claim 13, wherein the electromagnetic driving mechanism is configured to oscillate the membrane mirror by oscillating the electrical current in the conductor coupled to the membrane mirror in the presence of a constant magnetic field from the magnetic field source.

16. A method for sensing and correcting aberrations in a light signal received in an optics system, the method comprising:
reflecting the received light signal with a membrane mirror;
applying an electromagnetic force to the membrane mirror to oscillate the membrane mirror between convex and concave positions to defocus the light signal, alternately positively and negatively, wherein the electromagnetic force is applied by driving an electrical current through a conductor mechanically coupled to the membrane mirror and directing a magnetic field to cause an electromagnetic force on the conductor in response to the electrical current therein, the electromagnetic force tending to deform the membrane mirror;
imaging the reflected light signal onto a detector;
sensing the intensity of the light signal at a number of locations on the detector;
determining any aberrations in the light signal based on the sensed intensities of the light signal;
reflecting the received light signal with a deformable mirror; and
deforming the deformable mirror to correct for the determined aberrations, the deformable mirror reflecting a corrected light signal.

17. The method of claim 16, further comprising:
mechanically biasing a perimeter of a region of the membrane mirror.

18. The method of claim 16, wherein the electromagnetic force is applied by oscillating the electrical current through the conductor coupled to the membrane mirror in the presence of a constant magnetic field.

* * * * *